United States Patent
Luijben et al.

(10) Patent No.: US 8,033,516 B2
(45) Date of Patent: Oct. 11, 2011

(54) DEVICE SUITABLE FOR TILTABLY MOUNTING A DISPLAY SCREEN ON A WALL, AS WELL AS SUCH A METHOD

(75) Inventors: Stefan Arthur Luijben, Helmond (NL); Paul Robbert Grolle, Helmond (NL)

(73) Assignee: Vogel's Holding B.V., Eindhoven (NL)

( * ) Notice: Subject to any disclaimer, the term of this patent is extended or adjusted under 35 U.S.C. 154(b) by 38 days.

(21) Appl. No.: 12/506,080

(22) Filed: Jul. 20, 2009

(65) Prior Publication Data
US 2009/0278011 A1    Nov. 12, 2009

(30) Foreign Application Priority Data

Jan. 28, 2008   (NL) ...................................... 1034965

(51) Int. Cl.
    *E04G 3/00*   (2006.01)
(52) U.S. Cl. .................. 248/284.1; 248/447; 248/447.1; 248/917; 248/921; 248/292.13; 70/92; 108/147
(58) Field of Classification Search ................ 248/447, 248/447.1, 455, 454, 456, 457, 465, 917, 248/921, 922, 923, 279.1, 281.11, 283.1, 248/285.1, 287.1, 292.13, 317, 324, 323, 248/919, 292.14, 284.1; 70/92; 292/DIG. 49, 292/246, 248; 312/405.1, 7.2; 108/147, 108/9; 24/70 SK, 69 SK, 71 SK, 69 R
See application file for complete search history.

(56) References Cited

U.S. PATENT DOCUMENTS

| | | | | |
|---|---|---|---|---|
| 316,363 A * | 4/1885 | Hough | .......................... | 108/116 |
| 706,228 A * | 8/1902 | Fleming | ........................ | 248/456 |
| 1,121,713 A * | 12/1914 | Cogger | ............................. | 108/9 |
| 1,416,132 A * | 5/1922 | Smiley | .............................. | 108/9 |
| 2,328,471 A * | 8/1943 | Leffel | ............................... | 108/6 |
| 2,877,687 A * | 3/1959 | Bozin | ........................... | 248/477 |
| 3,774,247 A * | 11/1973 | Bradley | ........................... | 5/53.2 |
| 4,546,521 A * | 10/1985 | Ribarits | ...................... | 24/70 SK |
| 5,484,127 A * | 1/1996 | Mower et al. | ............... | 248/284.1 |
| 6,604,722 B1 | 8/2003 | Tan | ............................ | 248/276.1 |

(Continued)

FOREIGN PATENT DOCUMENTS

DE        9304086 U1        6/1993
DE        10224766 A1       2/2003

*Primary Examiner* — Kimberly T Wood
(74) *Attorney, Agent, or Firm* — Ladas & Parry, LLP

(57) ABSTRACT

A device suitable for tiltably mounting a display screen on a wall. The device comprises a wall member to be mounted on a wall, as well as a support member, to which the display screen is to be connected. The support member is connected to the wall member, being tiltable about a tilt axis. The device further comprises a pivotable connecting arm, which connects the wall member and the support member at a point spaced from the tilt axis. The connecting arm can be connected to one of a number of angle setting recesses for setting a desired angle of tilt between the support member and the wall member. The device comprises a slide which is movable relative to the wall member and the support member, which slide is provided with a number of recesses. The slide is movable with respect to the angle setting recesses from a first position, in which the recesses and the angle setting recesses are aligned, to a second position, in which the slide prevents the connecting arm being connected to the angle setting recesses, and vice versa.

7 Claims, 12 Drawing Sheets

U.S. PATENT DOCUMENTS

| | | | |
|---|---|---|---|
| 7,175,146 B2 | 2/2007 | Kim | 248/279.1 |
| 2002/0033436 A1 | 3/2002 | Peng et al. | 248/284.1 |
| 2002/0179801 A1 | 12/2002 | Kim | 248/441.1 |
| 2005/0061937 A1 | 3/2005 | Kim | 248/274.1 |
| 2007/0176067 A1 | 8/2007 | Monaco | 248/284.1 |
| 2008/0315049 A1 * | 12/2008 | Bailo et al. | 248/176.1 |

* cited by examiner

DEVICE SUITABLE FOR TILTABLY MOUNTING A DISPLAY SCREEN ON A WALL, AS WELL AS SUCH A METHOD

The invention relates to a device suitable for tiltably mounting a display screen on a wall, which device comprises a wall member to be mounted on a wall, as well as a support member, to which the display screen is to be connected, which support member is connected to the wall member, being tiltable about a tilt axis, which device further comprises a pivotable connecting arm, which connects the wall member and the support member at a point spaced from the tilt axis, which connecting arm can be connected to one of a number of angle setting recesses for setting a desired angle of tilt between the support member and the wall member.

The invention also relates to a method for tilting a wall member and a support member about a tilt axis relative to each other, wherein a connecting arm, via which the wall member and the support member are connected at a point spaced from the tilt axis, is connected to one of a number of angle setting recesses for setting a desired angle of tilt between the support member and the wall member.

With such a device and method, which are known from U.S. Pat. No. 7,175,146 B2, the connecting arm is pivotally connected to the support member by a pivot pin. One side of the pivot pin remote from the connecting arm is accommodated in one of the angle setting recesses. By pushing against the display screen, the connecting arm is connected to a higher angle setting recess, thereby decreasing the angle of tilt. By pulling at the display screen, the end of the connecting arm is moved to a lower angle setting recess, thereby increasing the angle of tilt. A force needs to be exerted on the display screen so as to disconnect the connecting arm from the angle setting recess, both for increasing and for decreasing the angle of tilt, which force must overcome a spring force. A drawback of such a device is the fact that if the spring force is too small, the force of gravity may cause the support member and the display screen connected thereto to tilt to a larger angle of tilt position than desired by a user. If the spring force is too large, a user will have to exert a relatively large force on the display screen, so that changing the angle of tilt is relatively difficult.

The object of the invention is to provide a device which makes it possible to realise a desired angle of tilt between the support member and the wall member in a reliable and simple manner.

This object is accomplished with the device according to the invention in that the device comprises a slide which is movable relative to the wall member and the support member, which slide is provided with a number of recesses and which is movable with respect to the angle setting recesses from a first position, in which the recesses and the angle setting recesses are aligned, to a second position, in which the slide prevents the connecting arm being connected to the angle setting recesses, and vice versa.

The connecting arm is moved to a lower angle setting recess by simply pushing against the display screen. The connection between the connecting arm and the angle setting recess in question remains ensured when someone pulls at the display screen. If a larger angle of tilt is desired, the slide must first be moved to the second position, in which the slide prevents the connecting arm being connected to the angle setting recesses. The support member is then tilted to a maximum realisable angle of tilt position in a continuous movement. Near said maximum realisable angle of tilt position, the slide is moved to the first position, causing the recesses in the slide and the angle setting recesses to be aligned relative to each other. From this position of the device, in which the support member includes a maximum realisable angle of tilt with the wall member via a connecting arm extending between the wall member and the support member, the angle of tilt can be decreased in steps by pushing against the display screen.

An advantage of such a device is that the support member cannot tilt undesirably relative to the wall member, whilst in addition the force required for reducing the angle of tilt is relatively small.

One embodiment of the device according to the invention is characterised in that the slide can be moved from the first position to the second position, and vice versa, by means of the connecting arm.

The connecting arm is thus used both for setting the desired angle of tilt and for moving the slide. so that the number of required parts of the device is relatively limited.

Another embodiment of the device according to the invention is characterised in that the slide is provided with a projection near at least one end, with which the connecting arm is to be brought into engagement for moving the slide from the first position to the second position, or vice versa.

The projection makes it possible to change the position of the slide in a simple manner.

Yet another embodiment of the device according to the invention is characterised in that the wall member is provided with the slide, whilst the connecting arm is pivotally connected to the support member with an end remote from the wall member by a pivot pin.

The support member to be connected to the display screen is thus of simple construction and can be connected to the display screen at practically any position.

Yet another embodiment of the device according to the invention is characterised in that, in use, the pivot pin is positioned higher than the end of the connecting arm that is in engagement with the wall member.

In this way it is ensured in a simple manner that when someone pushes against the display screen, the connecting arm will be moved to a lower angle setting recess partially under the influence of the force of gravity.

Yet another embodiment of the device according to the invention is characterised in that the wall member can be connected to a wall plate to be fixed to a wall, whilst the connecting arm can be pivoted to a position in which it is disconnected from the wall member before the wall member is connected to the wall plate.

In this way the connecting arm can be disconnected from the wall member, making it possible to connect the support member to the display screen in a simple manner. After the support member has been connected to the display screen, the connecting arm can be connected to the wall member, whereupon the wall member can be connected to a wall.

The invention also relates to a method for tilting of support member provided with a display screen relative to a wall member in a simple and reliable manner.

This object is accomplished with the method according to the invention in that the support member is moved to a smaller angle of tilt position in steps, wherein, in order to increase the angle of tilt, the support member is first tilted to the minimum realisable angle of tilt position and subsequently, in a continuous tilting movement, to the maximum realisable angle of tilt position, after which it is tilted to the desired angle of tilt position in steps.

In this way the force required for decreasing the angle of tilt is relatively small, whilst an undesirable increase of the angle of tilt under the influence of the force of gravity is prevented in a simple manner.

The invention will now be explained in more detail with reference to the drawings, in which.

Like parts are provided with the same numerals in the figures.

Figure 1A:
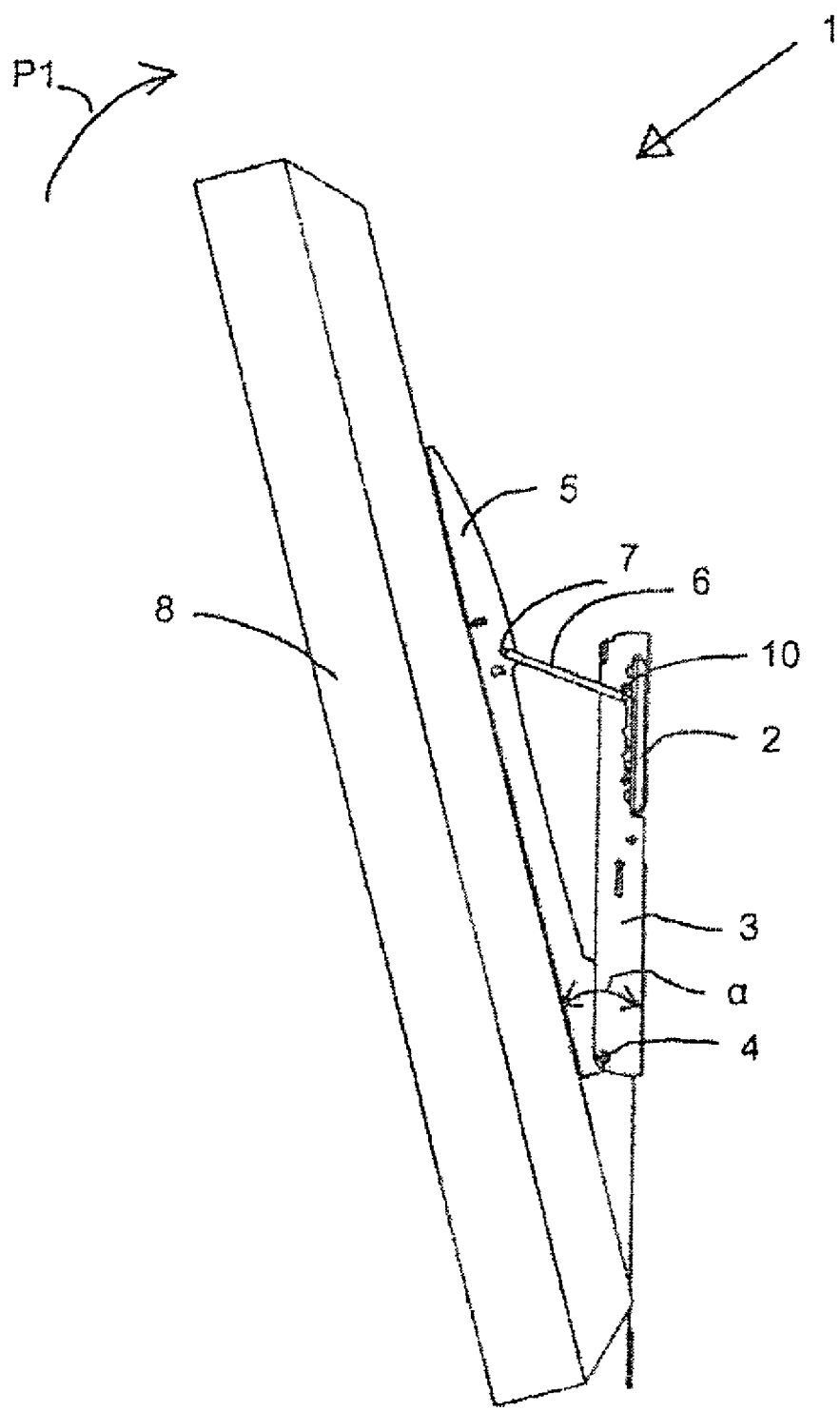
FIGS. 1a-1c show, respectively, a side view with a display screen, a perspective view without a display screen and a larger-scale detail of a device according to the invention with a maximum realisable angle of tilt.
Figure 1B:
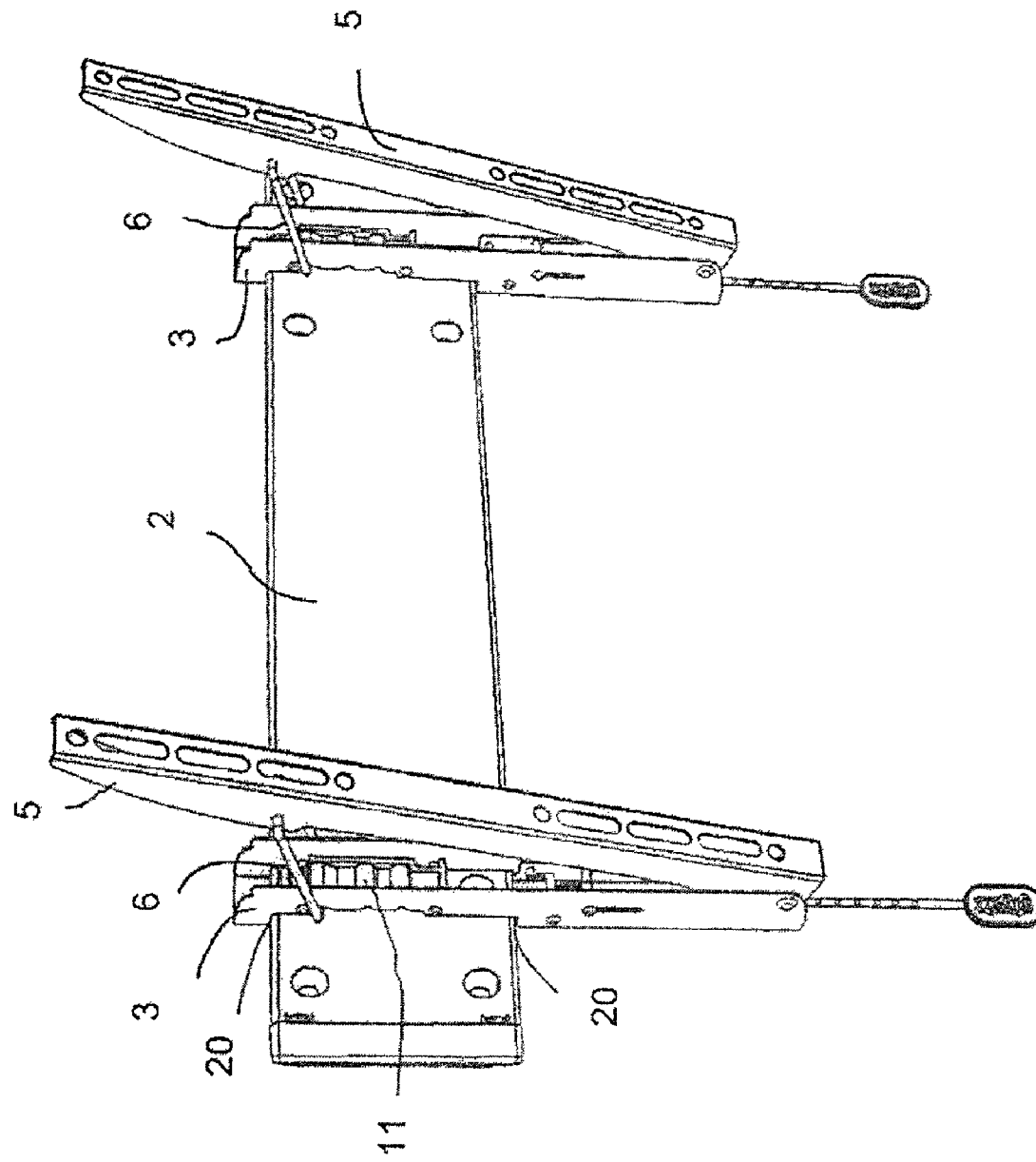
Figure 1C:
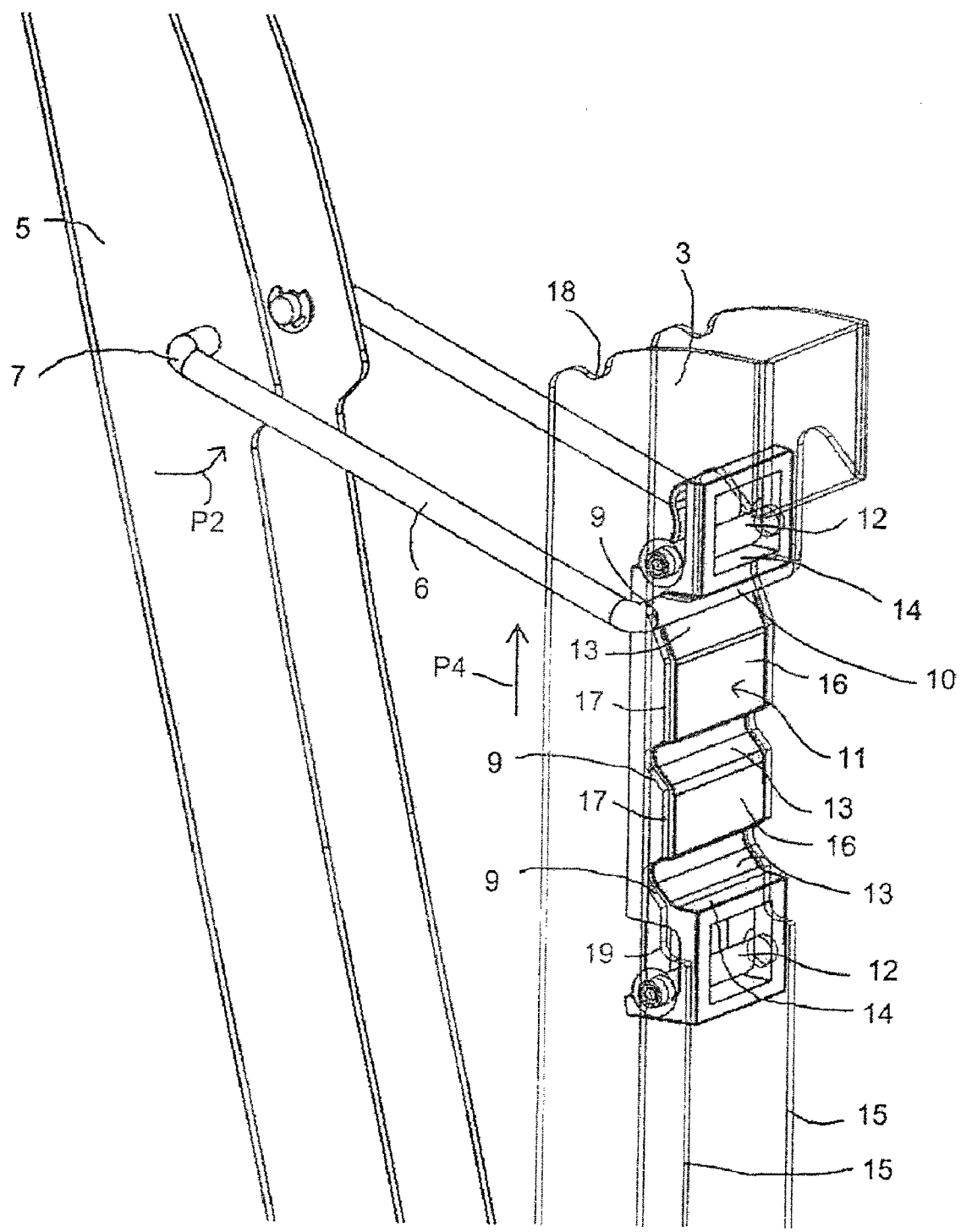

FIGS. 1a-1c shown, respectively, a side view, a perspective view and a larger-scale detail of a device 1 according to the invention, which comprises a wall plate 2 fixed to a wall (not shown), a wall member 3 connected thereto, a support member 5 connected to the wall member 3, being tiltable about a tilt axis 4, and a connecting arm 6. The connecting arm 6 is pivotally connected to the support member 5 by a pivot pin 7. The connection between the connecting arm 6 and the wall member 3 will be explained in more detail hereinafter with reference to FIG. 1c. A display screen 8, for example a plasma screen or an LCD screen, is connected to the support member 5. As is clearly shown in FIG. 1b, a single wall plate 2 for connecting the display screen 8 thereto is fixed to a wall, to which wall plate two wall members 3 with support members 5 tiltably connected thereto are connected. In this way a stable support of the display screen 8 is obtained. It is also possible, however, to provide only one wall member 3 or more than two wall members 3.

As FIG. 1c clearly shows, the wall member 3 is provided with a number of angle setting recesses 9 on a side remote from the support member 5, in which a connecting rod 10 of the connecting arm 6 can be positioned. The wall member 3 is further provided with a slide 11, which is slidably supported near both ends on pins 12 connected to the wall member 3. The slide 11 is provided with a number of recesses 13, which are aligned with the angle setting recesses 9 in the wall member 3 in the first position of the slide 11 that is shown in FIG. 1c. The slide 11 is provided with stops 14 near both ends, which stops extend to the same level as sides 15 of the wall member 3. Between the recesses 13, the slide comprises surfaces 16, which are located at the same level as sides 17 of the wall member 3 that are located between the angle setting recesses 9.

Figure 4A:
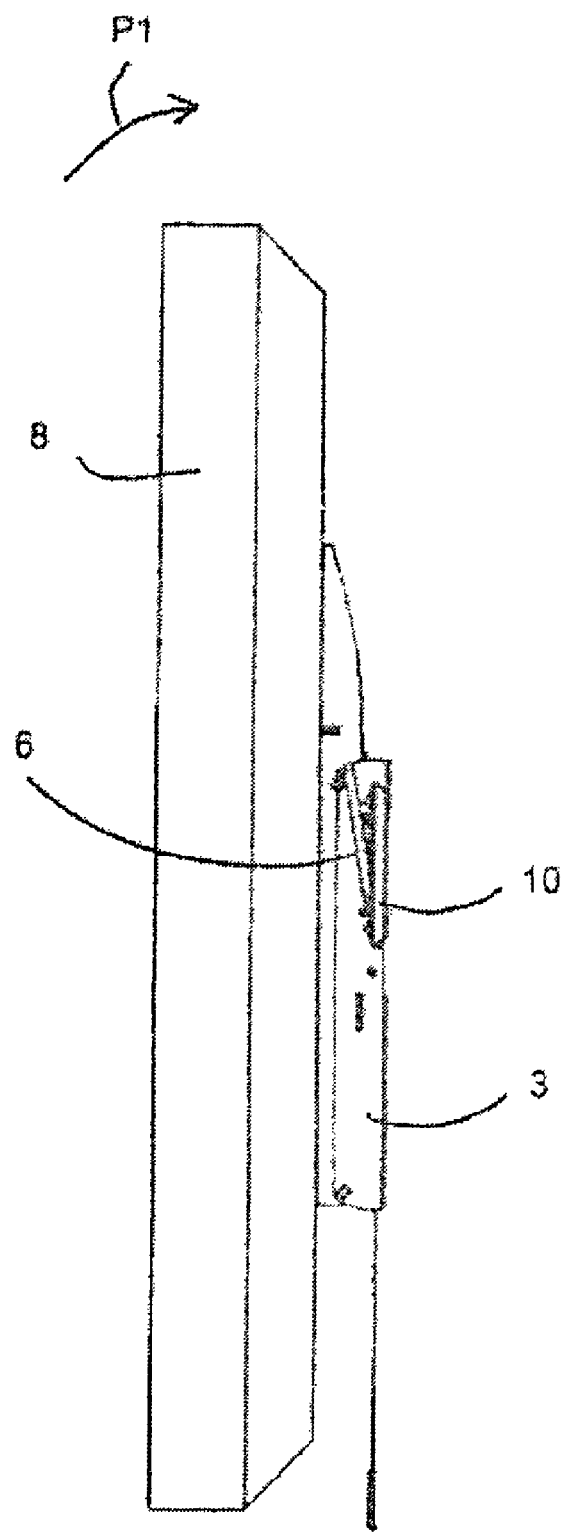
FIGS. 4a-4c show, respectively, a side view with a display screen, a side view without a display screen and a larger-scale detail of the device of FIGS. 1a-1c in a fourth angle of tilt position, which fourth angle of tilt position is the minimum realisable angle of tilt position.
Figure 4B:
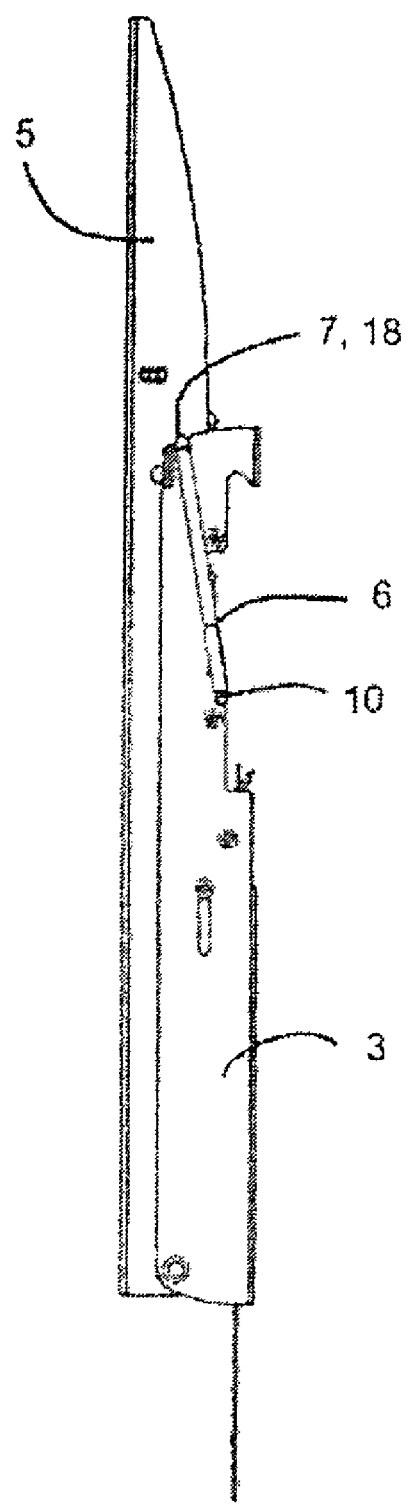
Figure 4C:
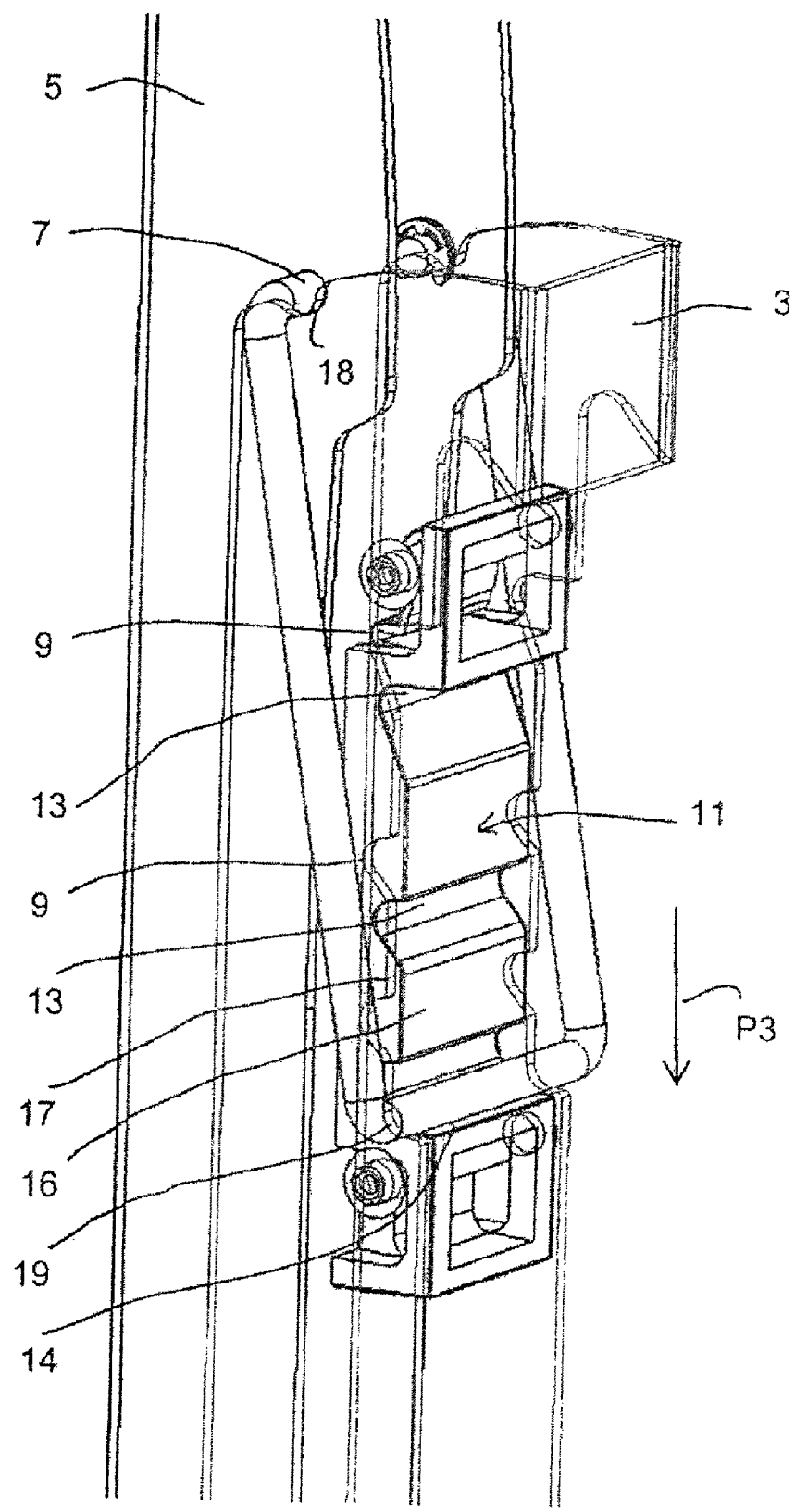

Near the upper side, the wall member 3 is further provided with notches 18, whose function will be explained in more detail yet with reference to FIG. 4c.

The manner of connecting the display screen to the device 1 and setting the angle of tilt α between the wall member and the support member 5 will now be explained in more detail with reference to the figures.

To connect the support member 5 to the display screen 8, the support member 5 is tilted so far towards the wall member 3 in the direction indicated by the arrow P1, with the wall member 3 disconnected from the wall plate 2, that the connecting arm 6 can be tilted in the direction indicated by the arrow P2 about the pivot pin 7 to a position in which it is disconnected from the wall member 3. The support member 5 can then be tilted in the opposite direction of the arrow P1 about the tilt axis 4 until the support member 5 and the wall member 3 are substantially in line. In this position of the support member 5 and the wall member 3, the support member 5 can be connected to the display screen 8 in a simple manner. Once a desired number of support members 5, for example two support members, have been connected to the display screen 8, each support member 5 is tilted about the tilt axis 4 to a position in which the connecting arm 6 is connected to an angle setting recess 9 of the wall member 3. The wall members 3 are now connected to the wall plate 2 with hook-shaped ends 20 (see FIG. 1b) thereof. In this position, the connecting rod 10 is enclosed in a space bounded by the wall plate 2 and the projection 14.

Figure 2A:
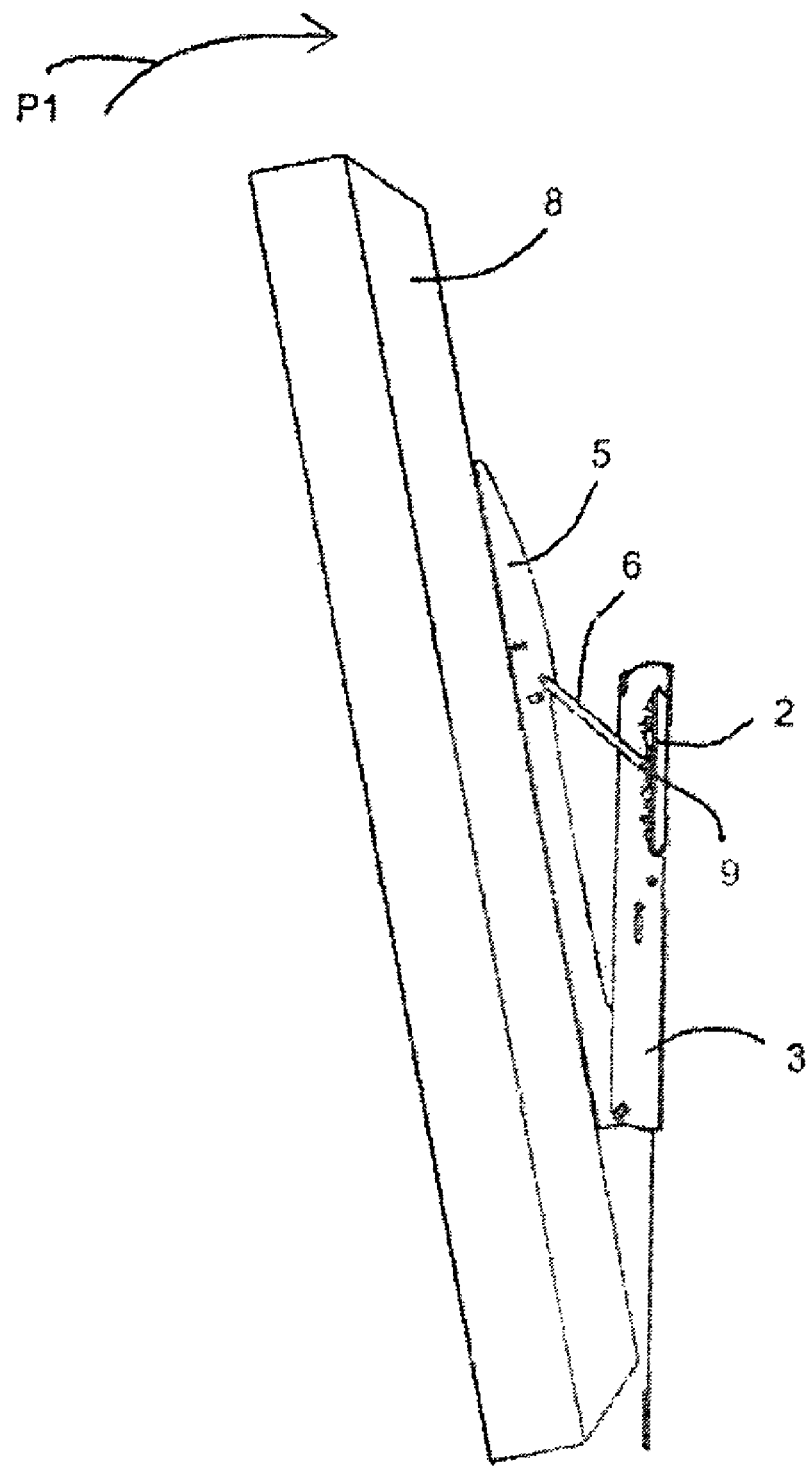
FIGS. 2a-2c show, respectively, a side view with a display screen, a side view without a display screen and a larger-scale detail of the device of FIGS. 1a-1c in a second angle of tilt position.
Figure 2B:
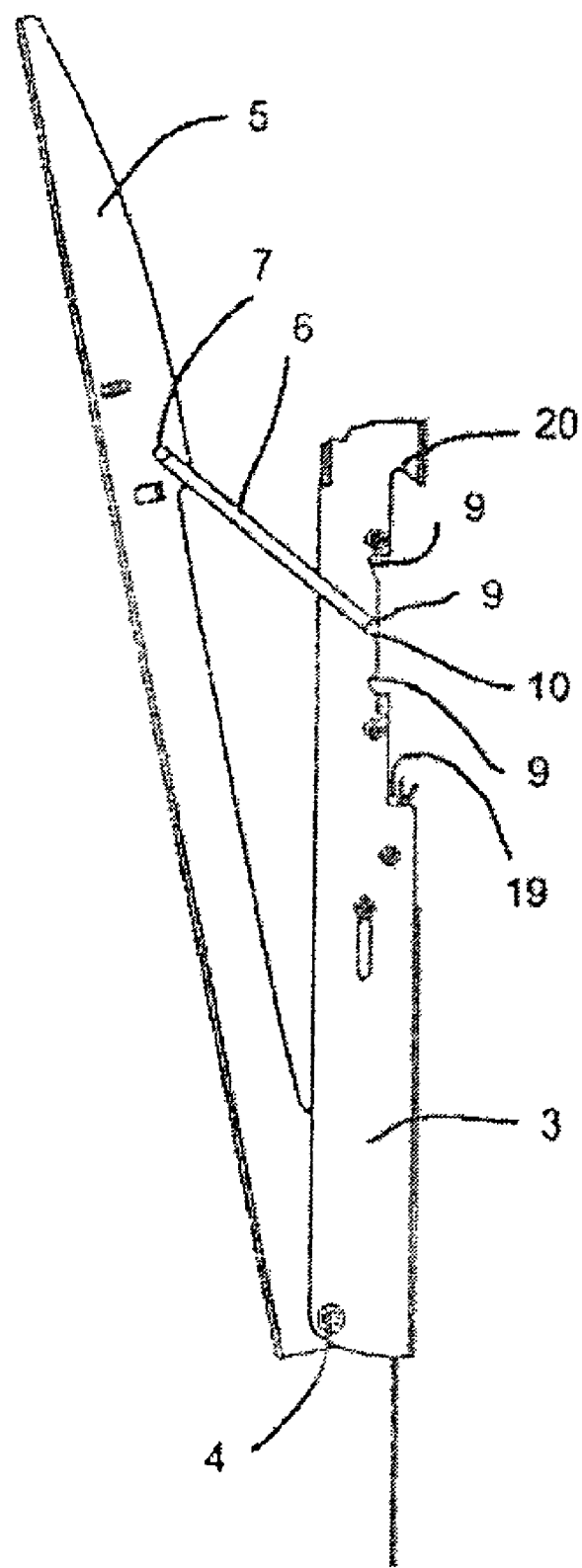
Figure 2C:
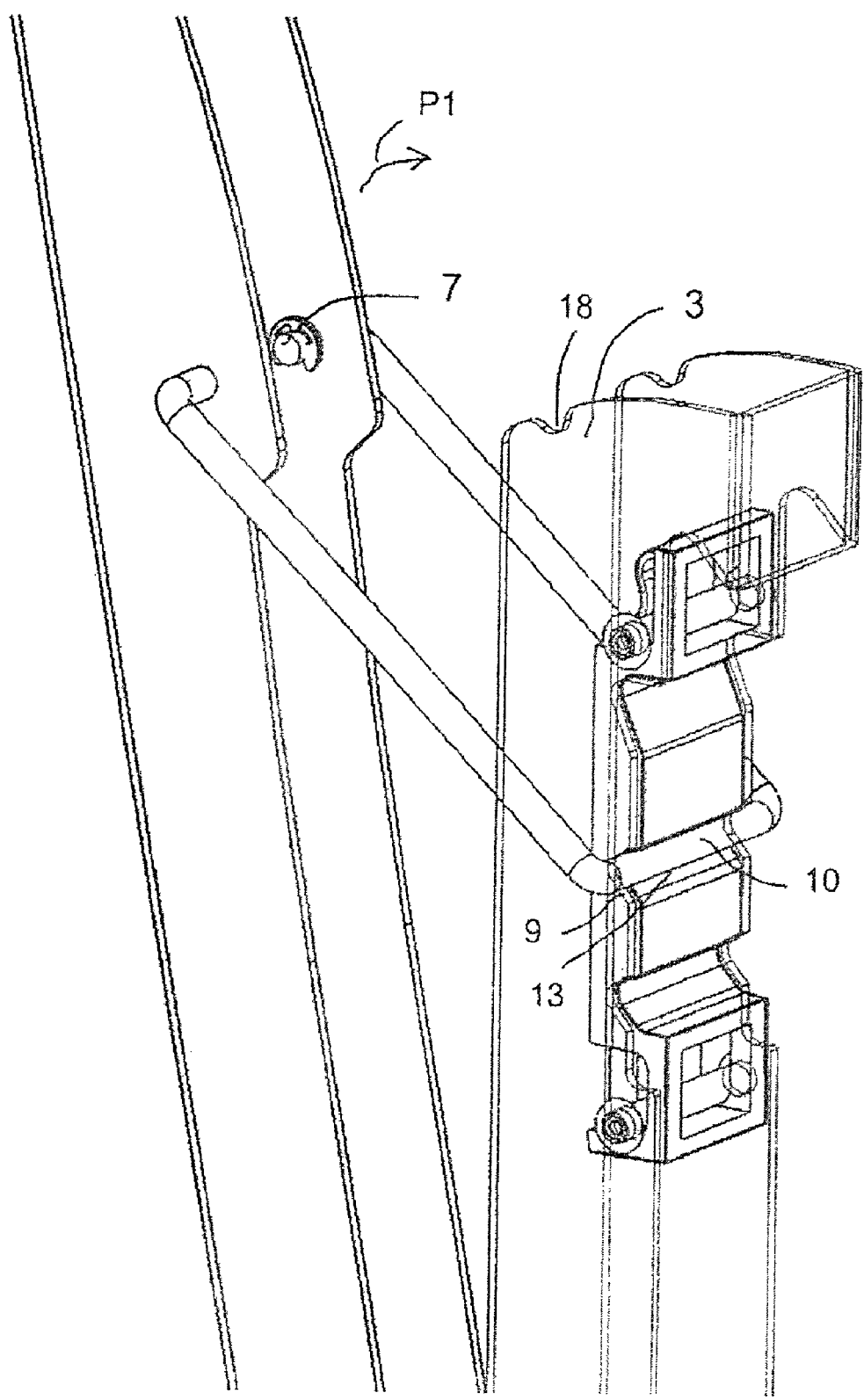
Figure 3A:
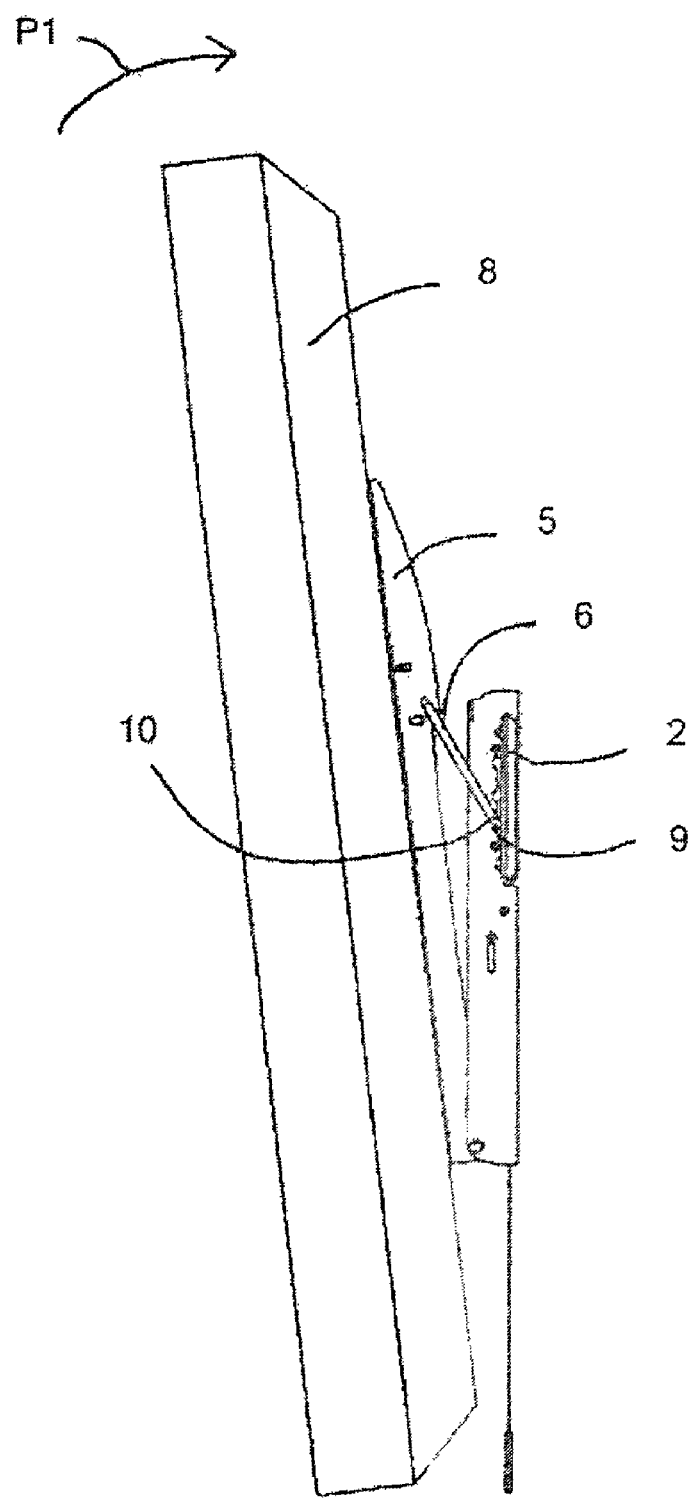
FIGS. 3a-3c show, respectively, a side view with a display screen, a side view without a display screen and a larger-scale detail of the device of FIGS. 1a-1c in a third angle of tilt position.
Figure 3B:
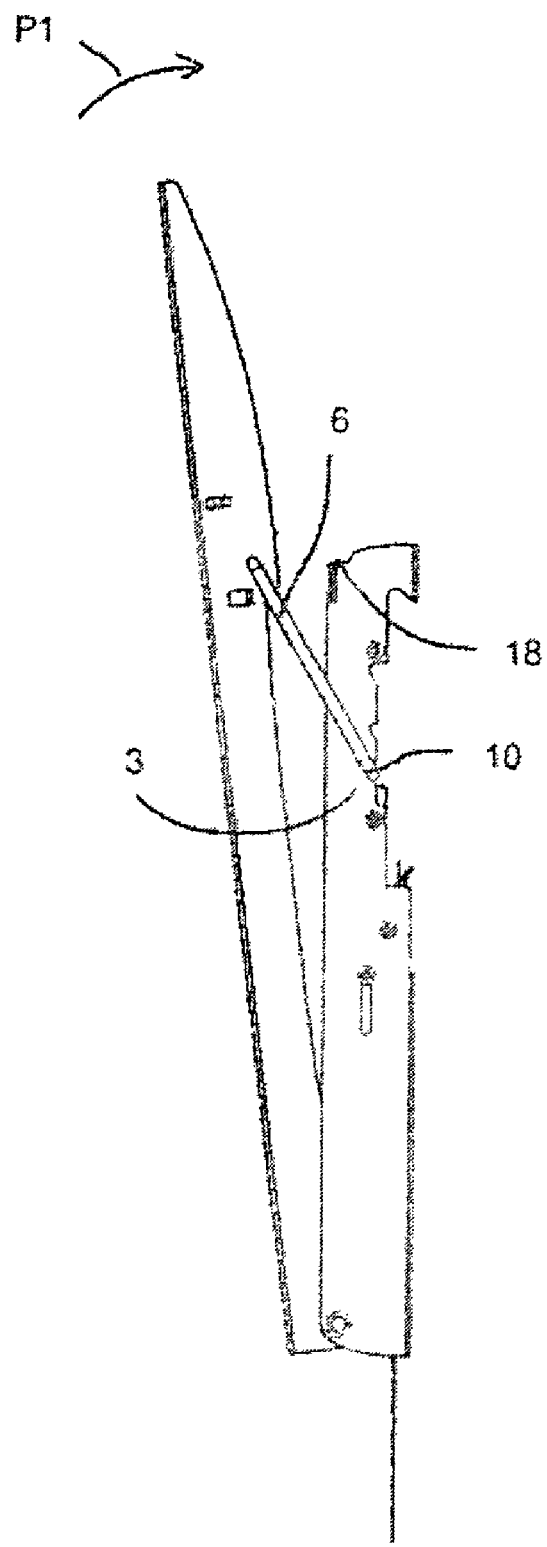

FIGS. 1a-1c show a first position of the support member 5, in which, when a connecting arm 6 is provided between the support member 5 and the wall member 3, the support member 5 and the wall member 3 include the maximum realisable angle of tilt α between them. The slide 11 is now in a first position, in which the recesses 13 are aligned with the angle setting recesses 9 in the wall member 3. To reduce the angle α, a user will exert a force on the display screen 8 in the direction indicated by the arrow P1, as a result of which the connecting rod 10 is disengaged from the angle setting recess 9 and subsequently moved over the surfaces 16 and the sides 17 to an angle setting recess 8 located therebelow. When the user subsequently lets go of the display screen 8, the connecting rod 10 will be moved into engagement with said angle setting recess 9 under the influence of the force of gravity. In FIGS. 2a-2c the connecting rod 10 is located in the second highest angle setting recess 9, with the support member 5 taking up a second angle of tilt position. By pushing against the display screen 8 again, the connecting rod 10 can be moved into a third angle setting recess 9 (seen from above) for setting a third angle of tilt position (see FIGS. 3a-3c). When a force is exerted on the display screen 8 again from this angle of tilt position, the connecting rod 10 will be moved into contact with the projection 14, with the connecting rod 10 exerting a downward force on the projection 14 of the slide upon further tilting of the display screen 8 and the support member 5 in the direction indicated by the arrow P1, as a result of which the slide 11 will be moved in the direction indicated by the arrow P3 to the second position shown in FIG. 4c. In said second position, the connecting rod 10 is located in the angle setting recess 19 of the wall member 3, which angle setting recess 19 is located closer to the wall plate 2 than the other angle setting recesses 9. As a result, the support member 5 can extend parallel to the wall member 3 (see FIG. 4b). In this position, the pivot pin 7 is located in the notch 18, so that tilting movement of the display screen 8 in the opposite direction of the arrow P1 is prevented in a simple manner. The notch 18 is a means for locking the support member 5 in position relative to the wall member 3, as it were. To make it possible to position the pivot pin 7 in the notch 18, the support member 5 undergoes a slight movement in the direction indicated by the arrow P3 with respect to the wall member 3. Said slight movement can take place because there is some play near the tilt axis 4 between the support member 5 and the wall member 3.

As a result of the slide 11 being moved in the direction indicated by the arrow P3, the angle setting recesses 9 and the recesses 13 are no longer in alignment, with the angle setting recesses 9 being closed by the surfaces 16 located between the recesses 13. The recesses 13 are closed by the sides 17.

Figure 3C:
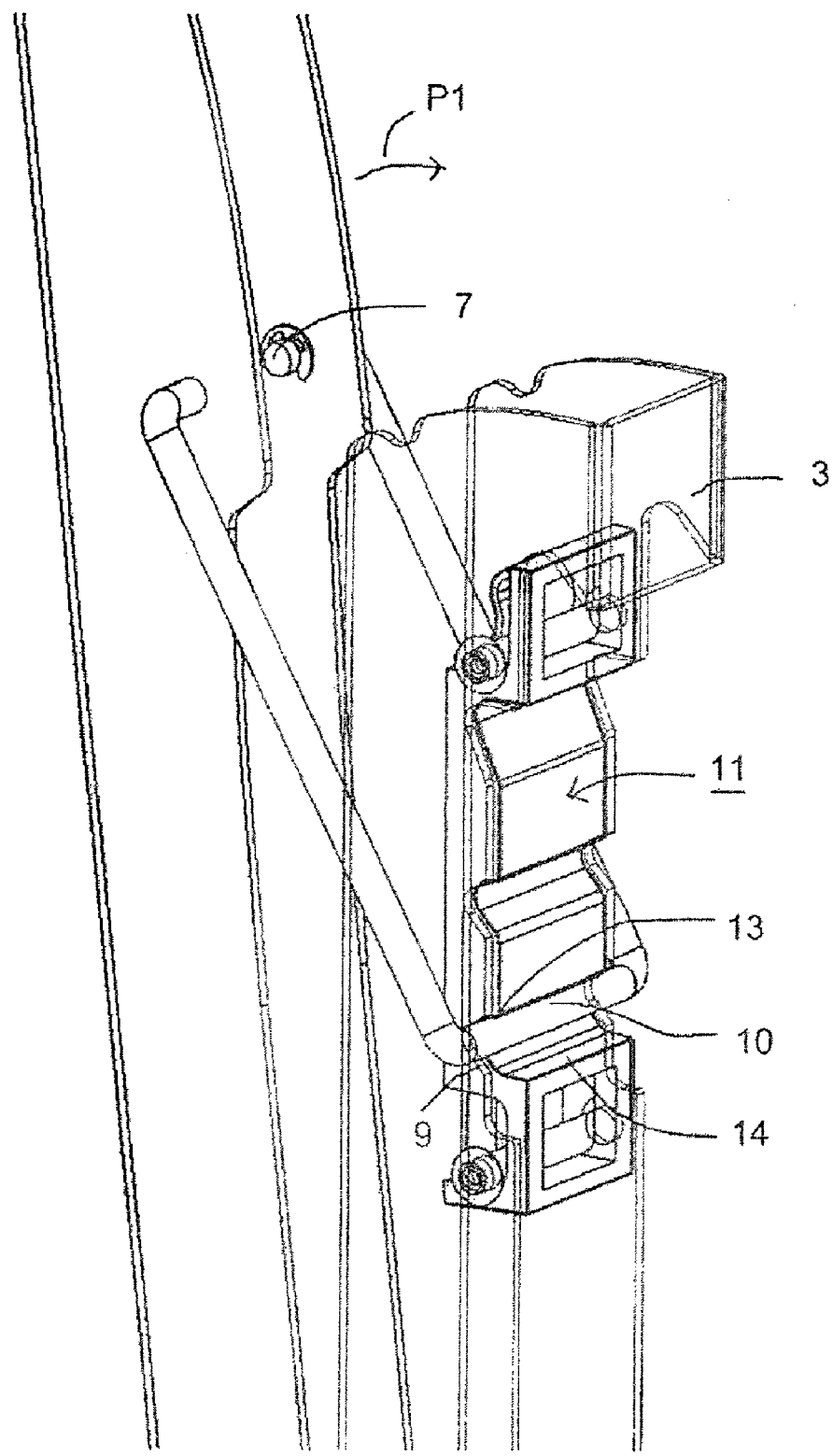

When a user wishes to tilt the display screen in the opposite direction of the arrow P1 the user will pull at the display screen 8, thereby lifting the pivot pin 7 out of the notch 18, after which the connecting rod 10 is moved over the sides 17 of the wall member 3 and the surfaces 16 of the slide 11 aligned therewith in a continuous movement. Once the connecting rod 10 is in contact with the projection 14 located near the upper side of the wall member 3, the slide 11 is moved in the direction indicated by the arrow P4 (see FIG. 1*c*) to the first position. In said first position of the slide 11, the angle setting recesses 9 and the recesses 13 are in alignment again. From said maximum realisable angle of tilt position α, a smaller angle of tilt, as shown in FIGS. 2*c*, 3*c* and 4*c*, can subsequently be realised in steps.

It is also possible to provide the slide 11 in the support member 5, in which case the connecting arm 6 is pivotally connected to the wall member by a pivot pin. The pivot pin must in that case be positioned higher than the connecting rod 10 of the connecting arm 6, which is positioned in the angle setting recesses.

Four tilting angle positions can be realised in the device that is shown in the figures. It is possible, however, to decrease or increase the number of tilting angle positions by changing the number of angle setting recesses 9 and recesses 13.

The slide can be provided with a spring or other device which makes it possible for the slide to take up either the first position or the second position, but not a position therebetween other than during the time the slide is intentionally being moved between the two positions.

It is also possible to provide the connecting arm with a spring, by means of which the connecting arm is urged to a position in which it is in engagement with the slide.

It is also possible to move the slide manually or otherwise from the first position to the second position, and vice versa.

The invention claimed is:

1. A device suitable for tiltably mounting a display screen on a wall, which device comprises a wall member to be mounted on the wall, as well as a support member, to which the display screen is to be connected, which support member is connected to the wall member, being tiltable about a tilt axis, which device further comprises a pivotable connecting arm, which connects the wall member and the support member at a point spaced from the tilt axis, which connecting arm can be connected to one of a number of angle setting recesses for setting a desired angle of tilt between the support member and the wall member, wherein the device comprises a slide which is movable relative to the wall member and the support member, which slide is provided with a number of recesses and which is movable with respect to the angle setting recesses from a first position, in which the recesses and the angle setting recesses are aligned, to a second position, in which the slide prevents the connecting arm being connected to the angle setting recesses, and vice versa.

2. A device according to claim 1, wherein the slide can be moved from the first position to the second position, and vice versa, by means of the connecting arm.

3. A device according to claim 1, wherein the slide is provided with a projection near at least one end, with which the connecting arm is to be brought into engagement for moving the slide from the first position to the second position, or vice versa.

4. A device according to claim 1, wherein the wall member is provided with the slide, whilst the connecting arm is pivotally connected to the support member with an end remote from the wall member by a pivot pin.

5. A device according to claim 4, wherein when in use, the pivot pin is positioned higher than the end of the connecting arm that is in engagement with the wall member.

6. A device according to claim 4, wherein the wall member can be connected to a wall plate to be fixed to the wall, whilst the connecting arm can be pivoted to a position in which it is disconnected from the wall member before the wall member is connected to the wall plate.

7. A device according to claim 1, wherein the device comprises means for locking the support member in a minimum realisable angle of tilt position relative to the wall member.

\* \* \* \* \*